Patented Sept. 12, 1933

1,926,523

UNITED STATES PATENT OFFICE 1,926,523

PREPARATION OF HIGH GRADE SYNTHETIC ASPHALTS

Stewart C. Fulton, Elizabeth, and Vladimir Kalichevsky, Woodbury, N. J., assignors to Standard Oil Development Company, a corporation of Delaware No Drawing. Application December 29, 1931
Serial No. 583,702

5 Claims. (Cl. 106—31)

This invention relates to improvements in the manufacture of asphalts and more particularly to methods of improving the quality of low grade asphalts, whereby they are comparable to high grade, balanced, natural asphalts.

It is generally recognized that asphalts are a heterogenous mixture, mainly composed of asphaltenes, asphaltic resins and oily constituents, in varying proportions, on which depend the properties of the asphalt. Asphaltenes are the main constituent of an asphalt, colloidal in nature, and as such are dispersed in the oil phase, which latter acts as a plasticizer. The stability of the asphaltene dispersion is a function of the amount and type of the asphaltic resins which play the rôle of a peptizing agent. The ability of the resins to properly disperse the asphaltenes depends both on their physical and chemical nature. They must be soluble in all proportions in the oily constituents comprising both paraffinic and naphthenic type oils and in addition must possess the unique property of peptizing asphaltenes in an oil suspension.

A high grade asphalt possesses all three constituents in a balanced combination, in the proper proportions to produce maximum ductility, stability towards association connected with breakdown on weathering and other characteristically desirable properties.

Asphalt compositions deficient in resins are non-plastic even although there is sufficient oily material to properly plasticize them under conditions of optimum asphaltene dispersion. This condition frequently occurs in the production of high softening point asphalts from low softening point petroleum asphalts by methods known to the art as "blowing". During this process asphaltenes are formed both directly from the oil and through the intermediate stage of resins. Part of the resins, representing the unstable fraction of the resins originally present are also converted to asphaltenes. In general such oxidation processes diminish the original resin content and do not produce sufficient stable resins to properly disperse the asphaltenes so formed. Therefore, while it is easy to control the softening point, it is impossible to produce a balanced composition.

One of the most important problems in connection with the weathering of asphalts is the progressive breakdown of the unstable fractions of asphaltic resin to asphaltenes due to oxidation, accelerated by light. This is accompanied by loss in plasticity and the occurrence of what is called "carbonization". Such deleterious effects are largely induced by the unstable nature of parts of the resins.

In a co-pending application Serial No. 572,059, filed October 30, 1931, of Stewart C. Fulton, there is described a method for the preparation of resins from heavy residual hydrocarbon material of petroleum origin such as cracked tar, in which method the cracked tar is distilled to remove the oily constituents and to obtain a residue containing asphaltenes and resin. The residue is treated with a selective hydrocarbon solvent to separate the resin from the asphaltenes. The separated solution of resin can be treated with sulfuric acid, after which the resulting sludge is separated and the remaining resin solution is neutralized.

Similarly in a co-pending application Serial No. 572,058, filed October 30, 1931, of Stewart C. Fulton, a method is described for the preparation of resins from cracked tar of petroleum origin in which method the tar is distilled to remove the oil components. The distilled tar is chlorinated and the chlorinated product is subsequently distilled to remove the chlorine and oily constituents from the residue. Resin is separated from the residue by a selective solvent.

In still another co-pending application, Serial No. 572,060, filed October 30, 1931, by Stewart C. Fulton and John Kunc, a method is described for the preparation of synthetic resins from cracked tar of petroleum origin in which the tar is distilled to remove the oily components. The distillate is chlorinated and the chlorinated product is agitated with a condensing agent such as anhydrous aluminum chloride. The reaction product is hydrolyzed and then distilled to remove the oily constituents to leave a resinous residue. Treatment of the residue with a selective solvent separates the resin. Benzol or other aromatic hydrocarbon may be added simultaneously with the aluminum chloride.

We have found that cracked tar resins and synthetic resins of petroleum origin such as are described in the above identified applications have the property of being readily soluble in all combinations of oily constituents found in asphalts and further possess the unique property of peptizing asphaltene dispersions in oil. In addition thereto we have found that when cracked tar resins are refined according to the above mentioned applications, the unstable asphaltene forming resins are for the most part either stabilized or removed and in this respect are superior to asphaltic resins usually found in asphalts. Such tar resins may or may not be completely freed from asphaltenes or oily constituents but prepared in such a way so as to possess a high concentration of stable resin. We prefer, however, to carry out the refining to such an extent that both asphaltenes and oily constituents are removed.

Petroleum or other asphalt compositions including oxidized and unoxidized asphalts deficient in resins or containing large percentages of unstable resins may be improved both as to resistance to weathering and the properties depending on the extent of asphaltene dispersion, by blending with the above mentioned cracked tar resins and synthetic resins in amounts previously determined by analysis and governed by the ultimate physical properties.

The blending of resins with asphalts can be effected in a variety of ways. For example, we may heat both constituents above the softening points of either and blend with violent agitation or recycling through a colloid mill, or we may take up both constituents in a suitable solvent or dispersing agent such as heavy naphtha, kerosene, etc., and recover the blended asphalt by distillation. Any method may be used which results in a proper dispersion of asphaltenes in the resin-oil medium.

We do not wish to be limited by the theory of the role played by any of the constituents of the asphalt, but only to the extent to which they affect the property of the asphalt as a whole as brought out by the appended claims in which it is our desire to cover the invention as far as the prior art permits.

We claim:

1. The process of improving low grade asphalt which comprises blending said asphalt with cracked tar resins free from asphaltenes and substantially all the oil.

2. The process of improving low grade asphalt deficient in resinous constituents which comprises incorporating therein resins free from asphaltenes and substantially all the oil obtained from petroleum products.

3. The process of improving low grade asphalt which comprises blending said asphalt with stable cracked tar resins free from asphaltenes and substantially all the oil.

4. An asphalt composition comprising an asphalt containing unstable resins, and cracked petroleum tar resins free from asphaltenes and substantially all the oil.

5. An asphalt composition comprising an asphalt containing unstable resins, and stable cracked tar resins free from asphaltenes and substantially all the oil.

STEWART C. FULTON.
VLADIMIR KALICHEVSKY.